United States Patent
A et al.

(10) Patent No.: US 12,261,741 B2
(45) Date of Patent: Mar. 25, 2025

(54) SERVER TO SUPPORT CLIENT DATA MODELS FROM HETEROGENEOUS DATA SOURCES

(71) Applicant: Juniper Networks, Inc., Sunnyvale, CA (US)

(72) Inventors: Chandrasekhar A, Bangalore (IN); Jayanthi R, Bangalore (IN); Cyril Margaria, Dublin (IE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/328,550

(22) Filed: Jun. 2, 2023

(65) Prior Publication Data

US 2023/0308348 A1    Sep. 28, 2023

Related U.S. Application Data

(62) Division of application No. 16/800,545, filed on Feb. 25, 2020, now Pat. No. 11,711,262.

(51) Int. Cl.
*H04L 41/0806* (2022.01)
*G06F 12/0866* (2016.01)
*G06F 16/21* (2019.01)
*G06F 16/2452* (2019.01)
*G06F 16/27* (2019.01)

(52) U.S. Cl.
CPC ...... *H04L 41/0806* (2013.01); *G06F 12/0866* (2013.01); *G06F 16/219* (2019.01); *G06F 16/2452* (2019.01); *G06F 16/27* (2019.01)

(58) Field of Classification Search
CPC ............. H04L 41/0806; H04L 41/0853; H04L 41/0226; H04L 41/0803; G06F 12/0866; G06F 16/219; G06F 16/2452; G06F 16/27; G06F 9/4451; G06F 9/4482
See application file for complete search history.

(56) References Cited

U.S. PATENT DOCUMENTS

| 10,516,761 B1 | 12/2019 | A et al. |
| 10,574,750 B2 | 2/2020 | Arenas et al. |
| (Continued) | | |

FOREIGN PATENT DOCUMENTS

| CN | 107534671 A | 1/2018 |
| CN | 110505075 A | 11/2019 |
| EP | 3570495 A1 | 11/2019 |

OTHER PUBLICATIONS

Communication pursuant to Article 94(3) EPC from counterpart European Application No. 20175129.4 dated May 27, 2024, 5 pp.

(Continued)

*Primary Examiner* — Brian Whipple
(74) *Attorney, Agent, or Firm* — Shumaker & Sieffert, P.A.

(57) ABSTRACT

Network elements are managed with a server to support client data models from heterogeneous data sources. A server receives a first query for configuration data of a network element to be returned in a first model. The server determines a model type for the configuration data of the network element. When the model type is a second model that is not the first model, the server sends a second query to the network element for the configuration data to be returned in the second model and transforms the configuration data received from the network element into the first model. Additionally, the server returns the configuration data in the first model as a response to the first query.

12 Claims, 7 Drawing Sheets

(56) References Cited

U.S. PATENT DOCUMENTS

| | | | |
|---|---|---|---|
| 2005/0015471 | A1 | 1/2005 | Zhang et al. |
| 2005/0091291 | A1 | 4/2005 | Kaler et al. |
| 2005/0234931 | A1 | 10/2005 | Yip et al. |
| 2006/0184375 | A1 | 8/2006 | Stone et al. |
| 2010/0287270 | A1 | 11/2010 | Hashimoto et al. |
| 2018/0048730 | A1 | 2/2018 | Knecht et al. |
| 2018/0129716 | A1 | 5/2018 | Su |
| 2018/0196687 | A1 | 7/2018 | Dorr et al. |
| 2018/0246942 | A1 | 8/2018 | Chen et al. |
| 2019/0020544 | A1 | 1/2019 | Kristjansson |
| 2019/0147086 | A1 | 5/2019 | Pal et al. |
| 2019/0391980 | A1 | 12/2019 | Mundar |
| 2021/0266220 | A1 | 8/2021 | A et al. |

OTHER PUBLICATIONS

Notice of Intent to Grant from counterpart Chinese Application No. 202010420746.3 dated Mar. 29, 2024, 6 pp.

"Gremlin" Apache TinkerPop, GitHub, available at https://github.com/tinkerpop/gremlin/wiki (last accessed Feb. 25, 2020), 1 p., Sep. 30, 2010.

"GremlinDocs" ApacheTinkerPop, available at http://gremlindocs.spmallette.documentup.com/ (last accessed Feb. 25, 2020), 34 pp., Aug. 26, 2015.

Bjorklund, "YANG—A Data Modeling Language for the Network Configuration Protocol (NETCONF)," Internet Engineering Task Force, RFC 6020, Oct. 2010.

Communication pursuant to Article 94(3) EPC from counterpart European Application No. 20175129.4 dated Feb. 6, 2023, 7 pp.

Extended Search Report from counterpart European Application No. 20175129.4, dated Feb. 16, 2021, 18 pp.

First Office Action and Search Report, and translation thereof, from counterpart Chinese Application No. 202010420746.3 dated Apr. 24, 2023, 31 pp.

Harrington et al., "An Architecture for Describing Simple Network Management Protocol (SNMP) Management Frameworks," RFC 3411, Network Working Group, the Internet Engineering Task Force draft, Dec. 2002, 64 pp.

Partial European Search Report received in corresponding EP Application No. 20175129.4, dated Oct. 27, 2020, 15 pp.

Prosecution History from U.S. Appl. No. 16/800,545, dated Feb. 9, 2021 through Jun. 9, 2023, 125 pp.

Response to Communication pursuant to Article 94(3) EPC dated Feb. 6, 2023, from counterpart European Application No. 20175129.4 filed Jun. 6, 2023, 16 pp.

Response to Extended Search Report dated Feb. 16, 2021, from counterpart European Application No. 20175129.4 filed Mar. 1, 2022, 43 pp.

Response to Communication pursuant to Article 94(3) EPC dated May 27, 2024, from counterpart European Application No. 20175129.4 filed Nov. 20, 2024, 12 pp.

SERVER TO SUPPORT CLIENT DATA MODELS FROM HETEROGENEOUS DATA SOURCES

RELATED APPLICATION

This application is a division of U.S. application Ser. No. 16/800,545, filed Feb. 25, 2020, the entire contents of which are incorporated herein by reference.

TECHNICAL FIELD

This disclosure relates to computer networks, and more particularly, to management of network elements.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network elements typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing interfaces between network elements and providing a run-time programmable interface to manage configuration data. A server, operating on, for example, a network management system (NMS) device (also referred to herein as a controller device), may interact with network elements with low-level (that is, device-level) configuration data expressed in, for example, Yet Another Next Generation (YANG) data modeling language. The configuration data determines the scope and functions that can be performed by application programmable interfaces (APIs) interacting with services on the network elements. These APIs provide an interface that facilitates network elements programmatically accessing other network elements to, for example, obtain relevant configuration information. For example, a packet controller may need to interact with an optical controller to obtain topology and inventory of the optical controller. Example APIs that interact with the configuration data includes APIs that use the Representational State Transfer (REST) architecture. Specifically, one such example API is RESTCONF that uses HTTP methods to provide access to network elements. A configuration management server in the network, that may be, for example, implemented by the controller device, provides services that receive a command via the API and interact with a client operating on a target network element to manage the configuration data.

Devices that interact in a network often have different configuration formatted to conform to different schemas (e.g., different versions of a data model schema or a different data model schema). The schema defines, for example, the syntax and/or keywords of the configuration data. According to the techniques of this disclosure, the configuration management server includes (i) a data binder that acts as a translator from configuration data formatted in one schema to be formatted in another schema and (ii) a data mapper to handle the configuration data after being translated.

Traditionally, in a hierarchical data schema, if an administrator makes a request to a parent resource, the network element responds with information of the parent resource. To get information (e.g., version identifiers (IDs), etc.) of any child resource, an administrator or managing server must individually request them. According to the techniques of this disclosure, the client on the target network element that communicates configuration data recursively travels through the hierarchical structure, starting at a specified parent node, to return all of the version IDs of child nodes in the hierarchy. If any returned node has a different version ID, then the server can specifically make a request for the specific configuration data of that node.

From time-to-time, a network administrator, in order to determine which resources are available in the network, or retrieve configuration objects from the device, query a network for services and/or resources available on the network. Currently, the APIs, such as RESTCONF, do not support pagination; that is, the ability to request a response specifying a range of a responses with the ability to request the next range of responses. For example, some types of resources could have thousands of instantiations across the network. According to the techniques of this disclosure configuration management server facilitates making a request specifying a limit that specifies the number of records to be fetched from the server (e.g., a request for the first 800 records, etc.). Future requests (e.g., a request for records 801 to 1600) use the cursor ID to determine where the next range is to start from (e.g., the record after the record corresponding to the cursor ID). In that manner, even if the number of records changes (e.g., a subsequent record is deleted or added), the records are all eventually retrieved.

An example method includes receiving a first query for configuration data of a network element to be returned in a first model. The method also includes determining a model type for the configuration data of the network element. When the model type is a second model that is not the first model, the method includes sending a second query to the network element for the configuration data to be returned in the second model and transforming the configuration data received from the network element into the first model. Additionally, the method includes returning the configuration data in the first model as a response to the first query.

An example method includes storing in cache, configuration data for a plurality of resources along with corresponding resource-identifiers and version-identifiers. The method also includes, in response to an event, selecting one or more of the plurality or resources and using the resource-identifiers, query the corresponding version-identifiers. The method includes receiving a response with resource-identifiers and version-identifiers responsive to the query. The method includes comparing the received version-identifiers with the corresponding version-identifiers in the cache. Additionally, the method includes, in response to a difference between the one of the received version-identifiers and the corresponding version-id in the cache, requesting the configuration data of the resource associated with the corresponding resource-id, and storing the configuration data received in response to the request in the cache.

An example method includes receiving a first query for resources that specifies a query parameter and a response limit. The method also includes generating a first query response that includes a first list of resources that include a number of resources that satisfy the query parameter up to the response limit. Additionally, the method includes storing a first cursor id that identifies the last resource on the first list of resources in the first query response.

The details of one or more examples are set forth in the accompanying drawings and the description below. Other features, objects, and advantages will be apparent from the description and drawings, and from the claims. The response returns with the requested records, a count of the total number of records, and a cursor ID that specifies the ID of the last record in the response.

DETAILED DESCRIPTION

Figure 1:
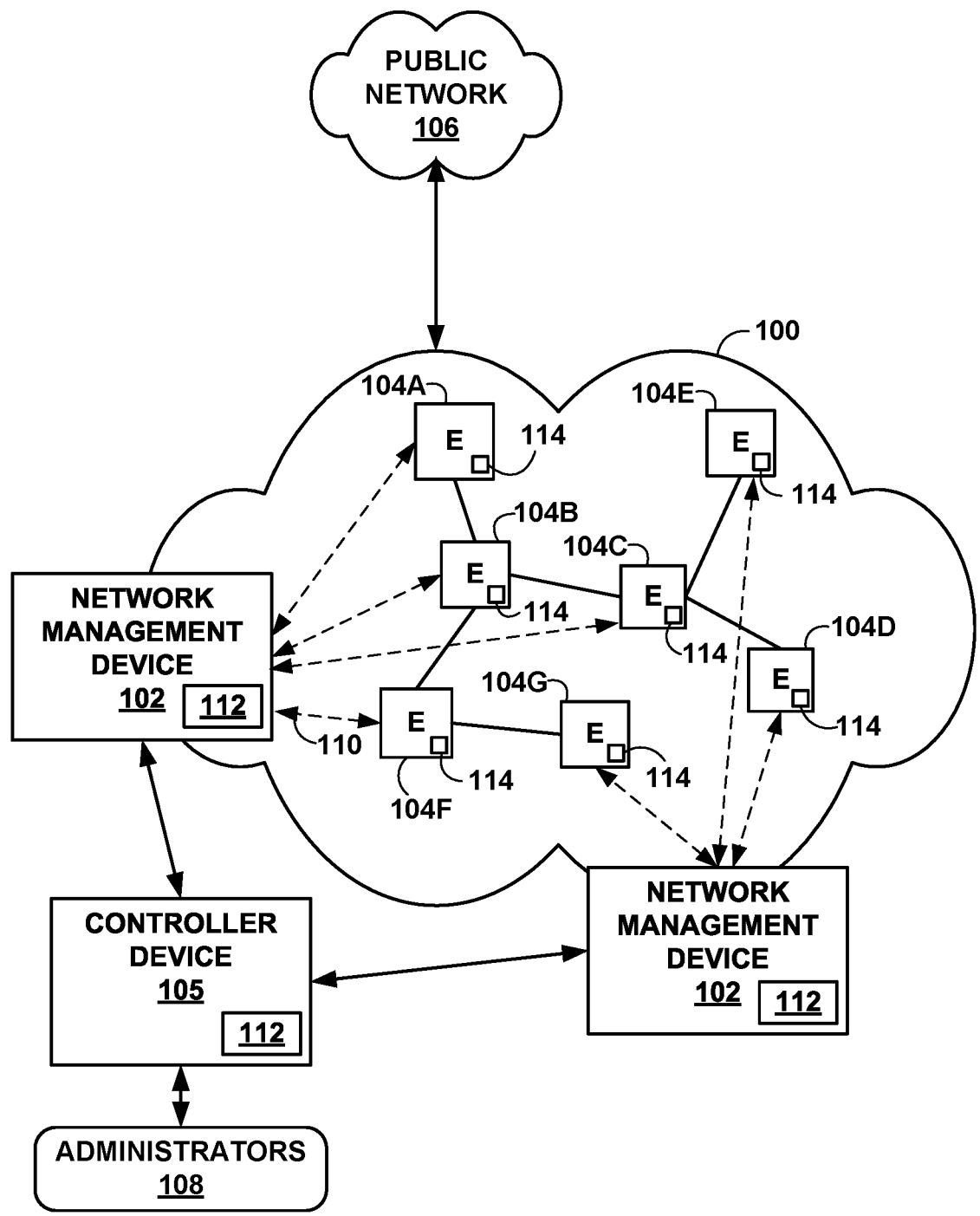
FIG. 1 is a block diagram illustrating an example including elements of an enterprise network that are managed using a management device.

Configuration management devices, including network management devices and controllers (such as software-defined networking (SDN) controllers, etc.) operate servers with configuration APIs, such as RESTCONF servers, to provide a programmatic interface for accessing network elements and network management devices, and to change the configuration data. For example, a RESTCONF server provides a HTTP-based protocol to provide access to network elements and network management devices and change the configuration data. For North Bound Integration (NBI), network elements provide interfaces (e.g., via clients operating on the network elements) to interaction the configuration APIs. Within a network, these clients may include the same configuration data. However, they may not provide the data in the same format or use the same data model (sometimes referred to as a "schema"). The format and/or data models includes, for example, the different syntax and/or the keywords used to define the configuration data. For example, one device could be modeled using a data modeling language that conforms to the latest modeling standard, and the other device could be modeled using a legacy modeling standard (e.g., legacy model could use "name" while the current model could use "name:"). This means, to facilitate communication with network elements, configuration data needs to be translated to allow the programmatic interface to read and write the configuration data. Because, for example, the variance of schema that may be deployed in a network, it would be burdensome for a client operating on a network element to transform the source data model (e.g., a YANG data model, etc.) into a target model. As described below, the configuration management server includes data binders that provide methods to transform from the format of one schema to the format of another schema. Thus, when a network element, network management device, or controller requests configuration data via the interface provided by the configuration management server, the network element, network management device, or controller may receive responses to requests in a format usable by the network element. The configuration API(s) on the configuration management server provide flexible HTTP GET & POST, PUT requests to manage the data in the data hierarchy of the configuration data. Data binders are configured to return the data based on Uniform Resource Identifier (URI) and the filters. Because a network element with a particular client data model may have a different data store and a different optimization model, in some examples, the client on the network element provides a transformation mechanism into the client data model (e.g., to the configuration management server).

Within the configuration data, resources are often organized in a hierarchy. Clients on network elements may cache datastore resources to use (e.g., to avoid repeated calls to determine available resources) along with a corresponding version identifier (ID). From time to time, to ensure that the resources are up to date, applications will request the version ID of the resources. When the version ID changes, the application determines that the resources have changed and can request the updated values.

Traditionally, when a request is made to a parent resource, the network element returns information from just the parent resource. To get the version IDs of any child resource, the server must individually request them. In a complex system with thousands of resources with parent-child relationships, this process can take thousands of individual calls that take up processing and bandwidth resources. As described below, in response to a query with a resource ID to a hierarchical data configuration, the client on the target network element recursively travels through the hierarchy. The client returns the version of the resource associated with the resource ID and the resource ID—version ID pairs of all of the children of the resource. That way, the server can make one call per parent resource instead of one call per resource. If any child resource in the hierarchy has a different version ID, then the server can specifically make a call for the specific resource.

From time-to-time, a network administrator, in order to determine which resources are available in the network, query a network for services and/or resources available on the network. Currently, the APIs, such as RESTCONF, do not support pagination; that is, the ability to request a response specifying a range of a responses with the ability to request the next range of responses. For example, some types of resources could have thousands of instantiations across the network. According to the techniques of this disclosure configuration management server facilitates making a request specifying a limit that specifies the number of records to be fetched from the server (e.g., a request for the first 800 records, etc.). Future requests (e.g., a request for records 801 to 1600) use the cursor ID to determine where the next range is to start from (e.g., the record after the record corresponding to the cursor ID). In that manner, even if the number of records changes (e.g., a subsequent record is deleted or added), the records are all eventually retrieved.

FIG. 1 is a block diagram illustrating an example including elements of an enterprise network 100 that are managed using a network management device 102. Managed network elements 104A-104G (collectively, "network elements 104") of enterprise network 100 include network elements interconnected via communication links to form a communication topology in order to exchange resources and information. Network elements 104 may include, for example, routers, switches, gateways, bridges, hubs, servers, firewalls or other intrusion detection systems (IDS) or intrusion prevention systems (IDP), computing devices, computing terminals, printers, other network elements, or a combination of such devices. Network management devices 102 may manage different network elements 104 within enterprise network 100. For example, one network management device 102 may be an optical controller that manages network elements 104 related to an optical network and another network management device 102 may be an internet protocol (IP) controller that managed network elements 104 related to the IP network. In the illustrated example, the network management devices 102 are communicatively coupled to a controller device 105 that manages the network management devices 102 that provide coordination between the different types of network elements 104. For example, the controller device 105 may provide optical network topology (e.g., the nodes and links within the enterprise network 100) to the IP network. While described in this disclosure as transmitting, conveying, or otherwise supporting packets, enterprise network 100 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 104 may be physical links (e.g., optical, copper, and the like), wireless, or any combination thereof.

Enterprise network 100 is shown coupled to public network 106 (e.g., the Internet) via a communication link. Public network 106 may include, for example, one or more client computing devices. Public network 106 may provide access to web servers, application servers, public databases, media servers, end-user devices, and other types of network resource devices and content.

Network management device 102 is communicatively coupled to elements 104 via enterprise network 100. Network management device 102, in some examples, forms part of a device management system, although only one device of the device management system is illustrated for purpose of example in FIG. 1. Network management device 102 may be coupled either directly or indirectly to the various elements 104. Once elements 104 are deployed and activated, administrators 108 uses network management device 102 (or multiple such management devices) to manage the network elements using a device management protocol. One example device protocol is the Simple Network Management Protocol (SNMP) that allows network management device 102 to traverse and modify management information bases (MIBs) that store configuration data within each of managed elements 104. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, network management device 102, also referred to as a network management system (NMS) or NMS device, and elements 104 are centrally maintained by an IT group of the enterprise. Administrators 108 interacts with controller device 105 and/or network management devices 102 to remotely monitor and configure elements 104. For example, administrators 108 may receive alerts from network management device 102 regarding any of elements 104, view configuration data of elements 104, modify the configurations data of elements 104, add new network elements to enterprise network 100, remove existing network elements from enterprise network 100, or otherwise manipulate the enterprise network 100 and network elements therein. Although described with respect to an enterprise network, the techniques of this disclosure are applicable to other network types, public and private, including LANs, VLANs, VPNs, and the like.

In some examples, administrators 108 uses controller device 105 or a local workstation to interact with elements 104, e.g., through telnet, secure shell (SSH), or other such communication sessions. That is, elements 104 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 110 with one of elements 104, e.g., element 104F, using controller device 105, to directly configure element 104F. In this manner, a user can provide commands in a format for execution directly to elements 104.

Further, administrators 108 can also create scripts that can be submitted by controller device 105 to any or all of elements 104. For example, in addition to a CLI interface, elements 104 also provide interfaces for receiving scripts that specify the commands in accordance with a scripting language. In a sense, the scripts may be output by controller device 105 to automatically invoke corresponding remote procedure calls (RPCs) on the managed elements 104. The scripts may conform to, e.g., extensible markup language (XML) or another data description language.

Administrators 108 uses controller device 105 to configure elements 104 to specify certain operational characteristics that further the objectives of administrators 108. For example, administrators 108 may specify for an element 104 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol, the Network Configuration Protocol (NETCONF) protocol (or a derivative thereof, such as the Juniper Device Management Interface), or the Representational State Transfer Configuration Protocol (RESTCONF) to perform the configuration. Network management device 102 may establish NETCONF and/or RESTCONF sessions with one or more of elements 104.

Configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Network management device 102 may include various reactive mappers for translating the intent data model differences. These functions are configured accept the intent data model (which may be expressed as structured input parameters, e.g., according to YANG or YAML). The functions are also configured to output respective sets of low-level device configuration data model changes, e.g., device configuration additions and removals. That is, $y1=f1(x), y2=f2(x), \ldots yN=fN(x)$.

Network management device 102 may use YANG modeling for intent data model and low-level device configuration models. This data may contain relations across YANG entities, such as list items and containers. Network management device 102 may convert a YANG data model into a graph data model, and convert YANG validations into data validations. Techniques for managing network elements using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Network management device 102 may receive data from one of administrators 108 representing any or all of create, update, and/or delete actions with respect to the unified intent data model. Network management device 102 may be configured to use the same compilation logic for each of create, update, and delete as applied to the graph model. In general, controllers, like network management device 102, use a hierarchical data model for intents, low-level data models, and resources. The hierarchical data model can be based on YANG or YAML. The hierarchical data model can be represented as a graph, as discussed above. Controller device 105 uses a hierarchical data model for high-level models that span the low-level models.

In the illustrated example, the controller device 105 and network management devices 102 includes configuration management servers 112 that facilitated management of the network elements 104 by, for example, the administrators 108. The configuration management server 112 may, for example, be a RESTCONF server. In some examples, he configuration management server 112 communicatively couples to network elements 104 and clients 114 operating on the network elements 104. Additionally or alternatively, in some examples, configuration management server 112 communicatively couples to network management devices 102 from a controller device 105. In a network 100, the various network elements 104 may use different schema to define configuration data. For example, network elements 104 made by different manufacturers may use different schema. As another example, different network elements may be operating with different versions data model language. As used herein, different versions of a data model language are considered to be different schema. As described below, the configuration management server 112 includes data binders that provide translations to transform from the format of one schema to the format of another schema. In some examples, upon receiving a request from one network element 104 (sometime referred to as the "requesting network element") for the configuration and/or resources of another network element 104 (sometimes referred to as the "target network element"), the configuration management server 112 facilitates translating the schema used by the target network element into the schema used on the requesting network element. The configuration management server 112 retrieves one or more data binders associated with the target network element to set and/or retrieve configuration data from the target network element. For example, in systems that use HTTP requests (e.g., system compatible with RESTCONF, etc.), the configuration management server 112 may provide HTTP GET & POST, PUT requests to manage the data in the data hierarchy of the configuration data. For example, a network 100 may include a packet controller and an optical controller from different manufacturers using two different schema, and the packet controller may need topology information from the optical controller. In such an example, the configuration management server 112 may retrieve the data binders associated with the two controllers and transform the commands to conform to the schema for optical controller and return topology information in a manner that conforms to the schema of the packet controller.

Additionally, in some examples, the configuration manager 112 facilitates caching configuration data of the resources on the network devices 104. To reduce the need to retrieve resources from the network devices 104, the configuration manager 112 maintains a cache that stores the configuration data. The configuration data includes a version identifier (ID). Occasionally, configuration data of resources on network device 104 change and the network device 104 (e.g., the configuration client 114 operating on the network device 104) will change the version ID to signify that the configuration has changed. The version ID may be, for example, algorithmically determined (e.g., using a hashing algorithm, etc.) based on the configuration. From time to time, to ensure that the definitions in the cache are up to date, the configuration manager 112 requests one or more version IDs from network devices 104 using resource IDs of the resources of interest. When the version ID changes, the configuration manager 112 determines that the definitions have changes and can request the new definitions of the specific resources. Configurations are stored in a hierarchy. In response to receiving version ID request with a resource ID, the configuration client 114 on the target network device recursively travels through the hierarchy. The configuration client 114 returns the version of the resource associated with the resource ID and the resource ID—version pairs of all of the children of that resource. Similarly, in some examples, configuration management server 112 on controller device 105 maintains a version cache and may query network management devices 102 for version IDs. For example, controller device 105 may cache resource configurations of network elements 104 related to network topology.

Additionally, in some examples, an administrator 108, via the configuration management server 112, may query for services and/or resources available on the network 100 in order to determine which resources are available in the network 100. The query specifies a limit the number of records to be fetched and/or displayed (e.g., a request for the first 800 records, etc.). The result to the query returns the specified number of records and a cursor ID (e.g., a resource ID, etc.) of the last resource within the specified number of records. Future requests (e.g., a request for records 801 to 1600) includes the cursor ID to determine where the next range is to start from (e.g., the record after the record corresponding to the cursor ID). In that manner, even if the number of records changes (e.g., a subsequent record is deleted or added), the records are not skipped.

Figure 2:
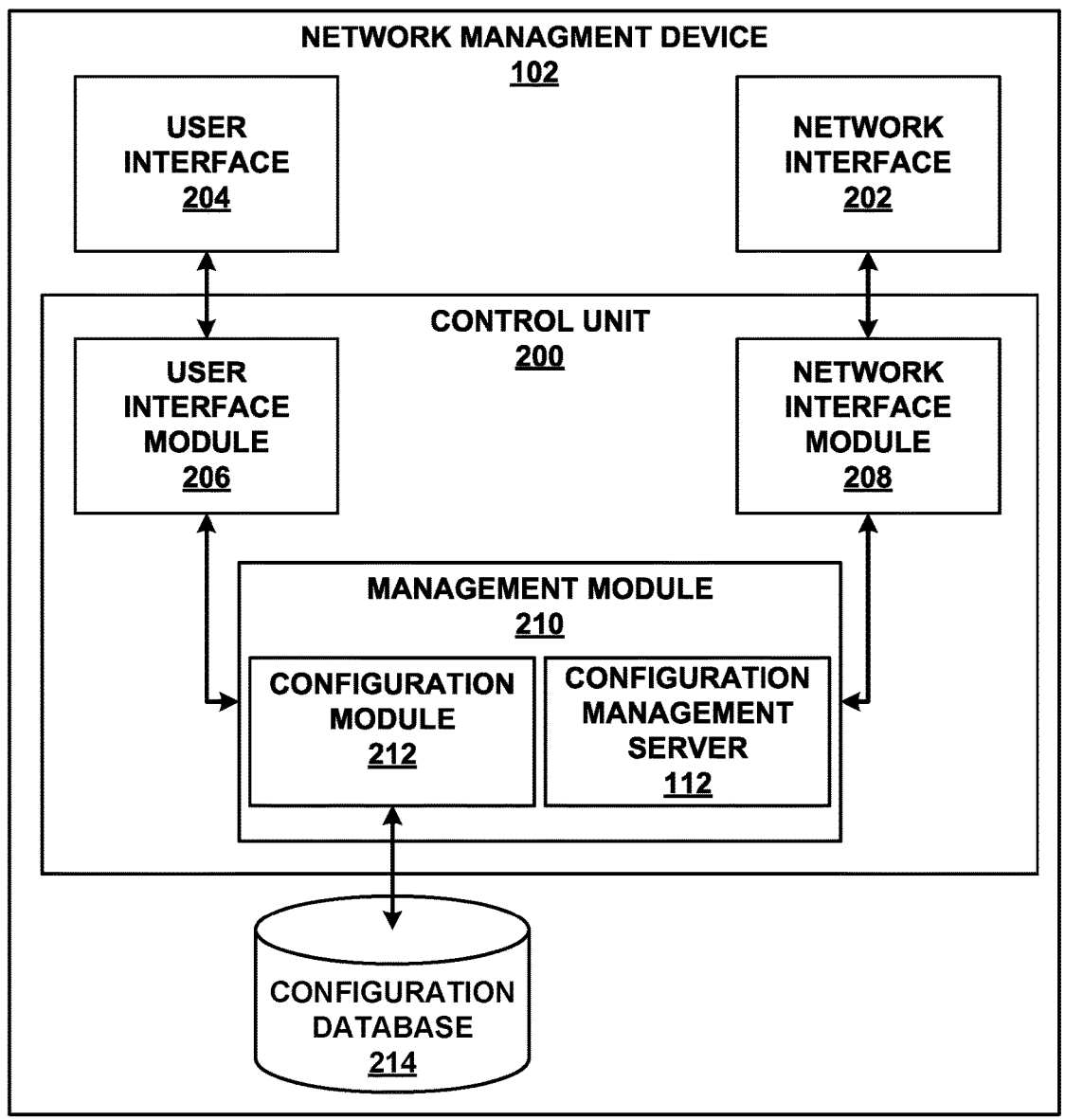
FIG. 2 is a block diagram illustrating an example set of components for the management device of FIG. 1.

FIG. 2 is a block diagram illustrating an example set of components for network management device 102 of FIG. 1. In this example, network management device 102 includes control unit 200, network interface 202, and user interface 204. Network interface 202 represents an example interface that can communicatively couple network management device 102 to an external device, e.g., one of elements 104 of FIG. 1. Network interface 202 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Network management device 102 may include multiple network interfaces in various examples, although only one network interface is illustrated for purposes of example.

Control unit 200 represents any combination of hardware, software, and/or firmware for implementing the functionality attributed to control unit 200 and its constituent modules and elements. When control unit 200 includes software or firmware, control unit 200 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 204 represents one or more interfaces by which a user, such as administrators 108 (FIG. 1) interacts with network management device 102, e.g., to provide input and receive output. For example, user interface 204 may represent one or more of a monitor, keyboard, mouse, touchscreen, touchpad, trackpad, speakers, camera, microphone, or the like. Furthermore, although in this example network management device 102 includes a user interface, administrators 108 need not directly interact with network management device 102, but instead may access controller device 102 remotely, e.g., via network interface 202.

Although user interface 204 is described for purposes of example as allowing administrators 108 (FIG. 1) to interact with controller device 102, other interfaces may be additionally or alternatively used. Controller device 102 includes a representational state transfer (REST) client (not shown) (sometimes referred to as a "RESTCONF" client) that may act as an interface to another device, by which administrators 108 configure controller device 102. Likewise, administrators 108 configure elements 104 by interacting with controller device 102 through the REST client.

In this example, control unit 200 includes user interface module 206, network interface module 208, and management module 210. Control unit 200 executes user interface module 206 to receive input from and/or provide output to user interface 204. Control unit 200 also executes network interface module 208 to send and receive data (e.g., packets) via network interface 202. User interface module 206, network interface module 208, and management module 210 may again be implemented as respective hardware units, or in software or firmware, or a combination thereof.

Functionality of control unit 200 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 200 may further include one or more computer readable storage media storing hardware or firmware instructions to be executed by processing unit(s) of control unit 200.

Control unit 200 executes management module 210 to manage various network elements, e.g., network elements 104 of FIG. 1. Management includes, for example, configuring the network elements according to instructions received from a user (e.g., administrators 108 of FIG. 1) and providing the user with the ability to submit instructions to configure the network elements. In this example, management module 210 further includes configuration module 212.

Management module 210 is configured to receive intent unified-graph-modeled configuration data for a set of managed network elements from a user, such as administrators 108. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B."

Controller device 102 also includes configuration database 214. Configuration database 214 generally includes information describing managed network elements, e.g., elements 104. Configuration database 214 may act as an intent data store, which may be used to persist and manage collections of intent data models. For example, configuration database 210 may include information indicating device identifiers (such as MAC and/or IP addresses), device type, device vendor, devices species (e.g., router, switch, bridge, hub, etc.), or the like (collectively "configuration data"). Configuration database 214 also stores current configuration information (e.g., intent data model, or in some cases, both intent data model and low-level configuration information) for the managed devices (e.g., elements 104). Configuration database 214 operates as a cache that stores the configuration data of network elements 104. Users, such as administrators 108, use the configuration data to manage network 100 without having to frequently request configuration data from each network element 104. As described below, from time-to-time, controller device 102 updates and/or otherwise manages the configuration data in configuration database 214 by requesting configuration data from each network element 104.

Management module 210 may model configuration database 214 as a graph data structure (or graph database) representing YANG configuration data elements. YANG specifies various types of data structures, including lists, leaflists, containers, containers with presence, and features. Management module 210 may model each of lists, containers, containers with presence, and features, as well as a top-level container, as vertices in a graph data structure. Alternatively, configuration database 214 may represent YAML configuration data elements.

After constructing the graph data structure, management module 210 may perform operations on data of the graph data structure. For example, management module 210 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 210 may execute conditions mapped to vertices and edges of the graph data structure if the condition attributes are changed. In response to the conditions, management module 210 may process additional changes, handled as functions as discussed in greater detail below.

In the illustrated example, the control unit 200 includes the configuration management server 112. Alternatively, the configuration management server 112 may operate as a separate server within the network 100 or on any network element within the network 100. As described below, configuration management server 212 provides an interface to configuration data of resources of network elements 104. For examples, the configuration management server 112 provides and interface, using data binders, to transform queries into different schema when resources within network elements 104 use different schema.

Additionally, in some examples, the configuration management server 112 supports pagination. The configuration management server 112 uses cursor-based pagination of resource information for a bulk retrieval of resources. When requesting a list of available resources on the network 100, the configuration manager 112 receive a request with (a) a cursor ID, (b) a limit or range, and, in some examples (c) criteria to use to identify resources of interest. The configuration management server 112 returns (a) a list of resources that satisfy the criteria up to the limit starting at the resource with the cursor ID after the received cursor ID, (b) a total number of available resources that satisfy the query criteria, and (c) the cursor ID of the last resource provided on the list of resources.

Figure 3A:
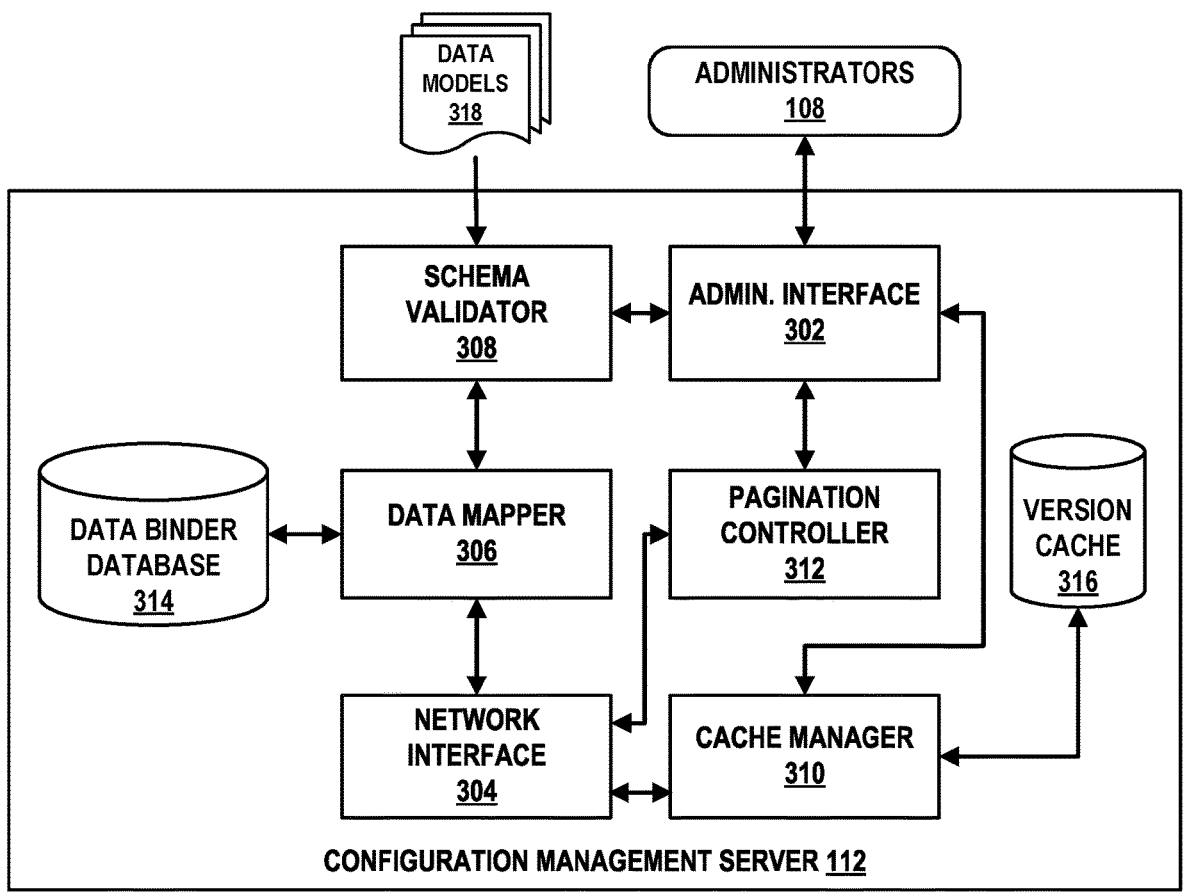
FIGS. 3A and 3B are block diagrams illustrating an example configuration manager that operated on the management device of FIGS. 1 and 2, that operates in accordance to the teachings of this disclosure.

FIG. 3A is a block diagram illustrating an example configuration manager 112 that operates in accordance with the teachings of this disclosure. The configuration management server 112 may be, for example, a RESTCONF server operated by the on the controller device 102. In the illustrated example, the configuration manager 112 includes an administrator interface 302, a network interface 304, a data mapper 306, a schema validator 308, and a pagination controller 312.

Figure 3B:
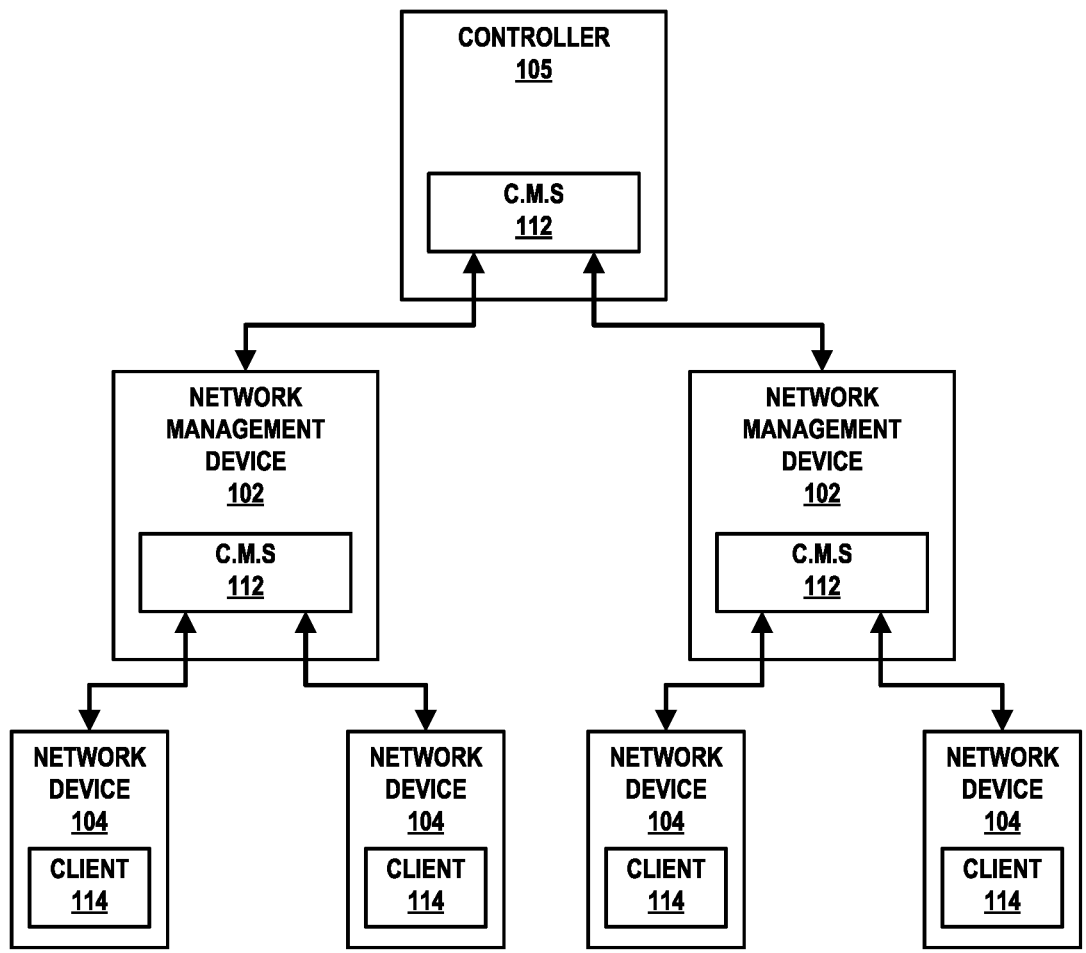

The administrator interface 302 communicates with the administrators 108 (e.g., via the user interface 204 of FIG. 2) to receive input (e.g., requests to perform tasks) and communicate responses to the input (e.g., responses to the requests, etc.). The network interface 304 is communicatively coupled to network appliances that to send requests and receive responses to those requests. As illustrated in FIG. 3B, the network interface 304 may communicate with the configuration clients 114 of the network element 104 in the network 100 or may communicate with the network interface of the network management devices 102.

The data mapper 306 is communicatively coupled to a data binder database 314. The data binder database 314 includes data binders that provide a mapping from the format from one schema to the format of another schema. For example, a requesting network element (or resource operating on a network element) may request information from a target network element that uses a different schema. As another example, the configuration model 210 may store configuration data for the network elements 104 in a selected schema. The data binder database 314 includes data binders for network elements 104. For example, the configuration data retrieved from the network elements 104 and stored in the configuration database 214 may be formatted using the lasted version of the YANG data model while one or more network elements may store the configuration using an earlier version of the YANG data model. An example structure of the data binders is shown on Table 1 below.

TABLE 1

| Data Binder Field | Description |
| --- | --- |
| Key | Signify the key mapping in binder. In case of container/leaflist/list |
| Method | The API Method |
| Resources | List of resources to be read or updated as part of data binding logic. |

TABLE 1-continued

| Data Binder Field | Description |
| --- | --- |
| Resource | The resource |
| Resource: Name | Name of the resource |
| Resource: Input | Input resource for the API |
| Resource API | API details |
| Mapping | Transformation logic |

The data binders (i) are registered for a given path in the YANG data model, (ii) support GET & SET methods, (iii) contain the resources and resource-mapping.

For example, the GET method of the data binder provides run-time context parameters such as parent path, query parameters include paging, sorting, and depth fields. The following is an example GET method for a data binder.

```
ext:data_binder{
   key '/device-id',
   method "GET",
   ext:resource {
      name "lsp"
      input_resource "node"
      rest_api {
         method "GET"
         uri /topology/network/{ {context.parent} }
      }
   }
   ext.mapping {
      ##Template code accessing resources##
   }
}
```

When the configuration manager 112 receives a GET request, the data mapper 306 validates the request and checks whether the data source is registered in the given path. If not, the data mapper 306 recursively checks if a parent is registered with data binder. The data mapper 306 retrieves the configuration data from the network element by calling GET method in the associated data binder. The data mapper 306 applies query parameters if the data binder is not registered in exact path. The data mapper 306 merges the data from different branches to return the configuration data.

The SET method of the data binder provides run-time context parameters, such as PUT, PATCH, and POST operations. The following is an example SET method for a data binder.

```
ext:data binder{
   key '/device-id',
   method "SET",
   ext:resource {
      name "lsp"
      rest_api {
         method "$context.operation"
         uri /topology/network/{ { context.parent} }
      }
   }
   ext.mapping {
      ##Template code mapping resources##
   }
}
```

When a PUT request is received, the data mapper 306 validates the request. The data mapper 306 checks whether the data source is registered in the given path. If not, the data mapper 306 recursively checks if a parent is registered with the data binder. If it is, the data mapper 306 calls the SET method in the data binder associated with the network element 104 of interest and uses the PUT operation. When a POST request is received, the data mapper 306 validates the request. The data mapper 306 checks whether the data source is registered in the given path. If not, the data mapper 306 recursively checks if parent is registered with the data binder. If it is, the data mapper 306 calls the SET method in the data binder associated with the network element 104 of interest and uses the POST operation. When a PATCH request is received, the data mapper 306 validates the request. The data mapper 306 checks whether the data source is registered in the given path. If not, the data mapper 306 recursively checks if parent is registered with the data binder. If it is, the data mapper 306 calls the SET method in the data binder associated with the network element 104 of interest and uses the POST operation.

In some examples, the schema validator 308 is a schema-aware data mapper that combines data from multiple sub-trees and returns the data. The schema validator 308 supports query parameters, such as content, depth, fields, and insert. In some examples, YANG data models are compiled into JSON schema. In such examples, the schema validator 308 uses the JSON schema to (a) validate the data, (b) filter the data based on query parameters, and/or (c) combine data from multiple data binders. In the illustrated example, the schema validator 308 receives data models 318 uploaded from clients 114 to automatically generate the data binder logic that supports data mapper 306 operations, such as PUT, PATCH, POST, and GET.

Administrators 108 may want to review resources that are available in the network 100. However, some resources may have thousands of instantiations across the different network elements 104. The pagination controller 312 facilitates cursor-paged pagination to facilitate reviewing the resources. The pagination controller 312 may, for example, receive any input from the administrators 108 to query the configuration data in the configuration database 214. As described below, the pagination controller 312 returns results to the query. Cursor-based pagination avoids the issues with offset-limit pagination. For example, with offset—limit pagination, if an item from a prior page is deleted while the client is paginating, all subsequent results will be shifted forward by one. Therefore, when the client requests the next page, there's one result that it will skip over and never see. Conversely, if the result is added to the list of results as the client is paginating, the client may see the same result multiple times, on different pages. To facilitate cursor-based pagination, the pagination controller 312 uses a cursor and a limit number along with the query parameters. The query parameters and the limit number may be received from the administrators 108. The cursor holds a unique identifier for a specific resource. The cursor acts as a pointer to the next record to start querying from to get the next page of results. The limit number signifies the number of records to be fetched. For example, if the limit number is 50, each page will include up to 50 results. The response includes the records responsive to the query within the specified limit, the cursor specifying an identifier of the resource corresponding to the last record in the response, and a total count. The total count number of resources responsive to the query parameters.

The pagination controller 312 retrieves records of resources (e.g., in the configuration database 214) responsive to the query parameters starting at the record after the record identified by the cursor up to a number of records specified by the limit number. The pagination controller 312 returns these records as a query response and stores the identifier of the last record in the cursor. Upon receiving an indication to return the next set of results (sometimes referred to as the "next page"), the pagination controller 312 retrieves records responsive to the query parameters starting at the record after the record identified by the cursor up to a number of records specified by the limit number.

In the illustrated example, the cache manager 310 caches the configuration data of resources operating on the network element 104 and updates the cache when the configuration data of a resource operating on a network device 104 changes. For example, Northbound applications can go out of synch with the controllers in many scenarios (e.g., a reboot of controller, a software upgrade of the controller, and a connectivity lost between the northbound application to the controller, etc.) To support caching, the configuration client 114 maintains, in a version cache 316, a "version" field for every datastore resource. The version field includes a version ID that changes when the configuration data associated with the corresponding datastore resource changes. For example, the version ID may increment or may be a number mathematically calculated based on the configuration data. The version ID is affected by configuration data resources and is not updated for changes to non-configuration data. Changes to configuration data resources may affect the version ID for that resource and any ancestor data resources. The caches manager 310 caches the version ID in a version cache 316.

Periodically (e.g., hourly, daily, etc.) or aperiodically (e.g., upon reset, upon reconnection to a network element 104, etc.), the cache manager 310 checks whether the cached data is out of synch by querying for the version ID for the datastore resources of interest. An example query is illustrated below.

```
GET /restconf/data/example-jukebox:jukebox/\
    Library/artist=FooFighters/albumn=WastingLIght HTTP/1.1?
    fields="songs(song/name, song/version-id_"
Host: example.com
Accept: application/yang-data+xml
```

In response to such a query, the network element might respond as follows.

```
HTTP/1.1 200 OK
Date: Tue, 7 Jan 2020 20:56:30 GMT
Server: example-server
Content-Type: application/yang-data+xml
Cache-Control: no-cache
Last-Modified: Tue, 7 Jan 2020 14:02:14 GMT
<album xmlns="example.com/ns/example-jukebox"
    xmlns:jbox="example.com/ns/example-jukebox">
    <name>Wasting Light</name>
    <version-id>a74eefc993a2b</version-id>
    <songs>
        <song>
            <name>Bridge Burning</name>
            <version-id>50132a41ee052</version-id>
        </song>
        <song>
            <name>White Limo</name>
            <version-id>e0c95ad3a6b56</version-id>
        </song>
    </songs>
</album>
```

For configuration data resources, the client 114 maintains a resource version for each datastore resource and returns the "version-id" attribute when it is retrieved as the target resource or ancestor resource with, for example, the GET or HEAD methods. When a resource is queried, the client 114 recursively searches the hierarchical structure and retrieves the resource ID and version ID for children of that resource. The resource ID and version ID are returned for each child resource. If any of the version IDs are different than the version ID stored in the version cache 316, the configuration manger 112 may request the specific configuration data.

Figure 4:
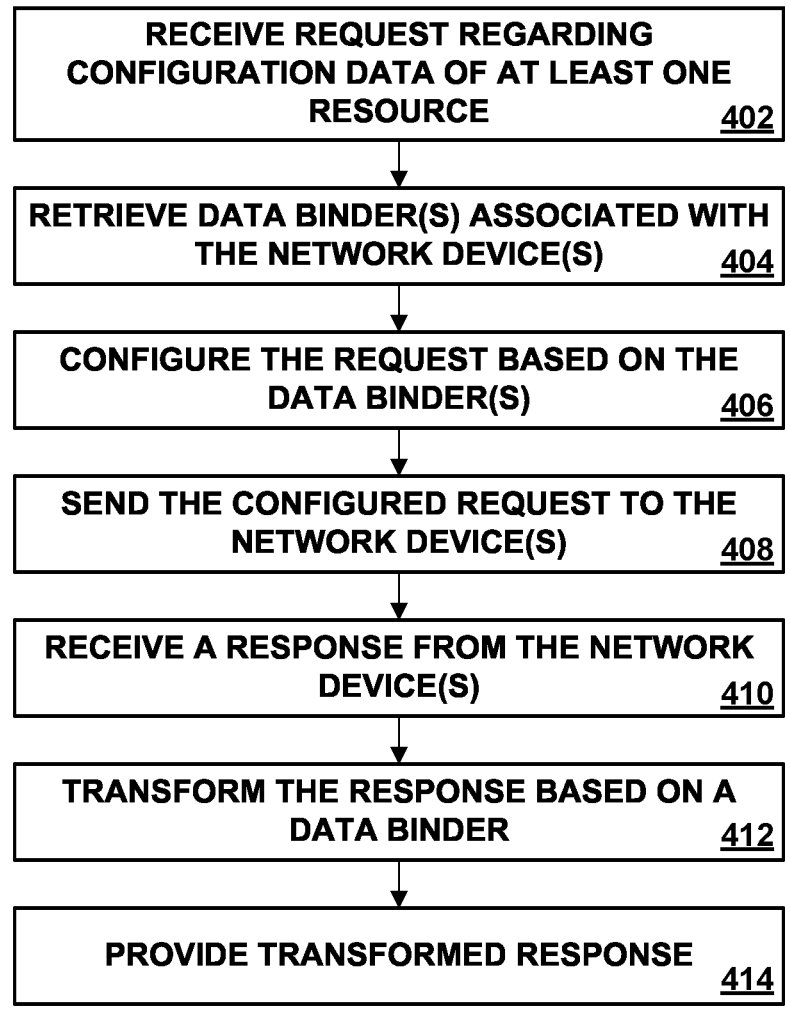
FIG. 4 is a flowchart of an example method of retrieving configuration data from network elements that store the configuration data in different schema.

FIG. 4 is a flowchart of an example method of retrieving configuration data from network elements 104 that store the configuration data in forms that conform to different schemata. Initially, the configuration management server 112 receives a request regarding configuration data of resources operating on one or more network elements 104 (402). For example, the request may include a GET operation to retrieve the configuration data or a SET operation to set the configuration data. The configuration management server 112 retrieves, from the data mapper database 314, the data binder(s) associated with the resources on the network elements 104 to be queried (404). The configuration management server 112 configures the requests based on the data binder(s) registered for a given path in the data model of the target network element (406).

The configuration management server 112 sends the configured request(s) to the target network element (408). The configuration management server 112 receives a response from the target network element 104 (410). The configuration management server 112 transforms the configuration data to, for example, confirm to the schema of the requesting network element (412). The schema validator 308 provides the results (414).

Figure 5:
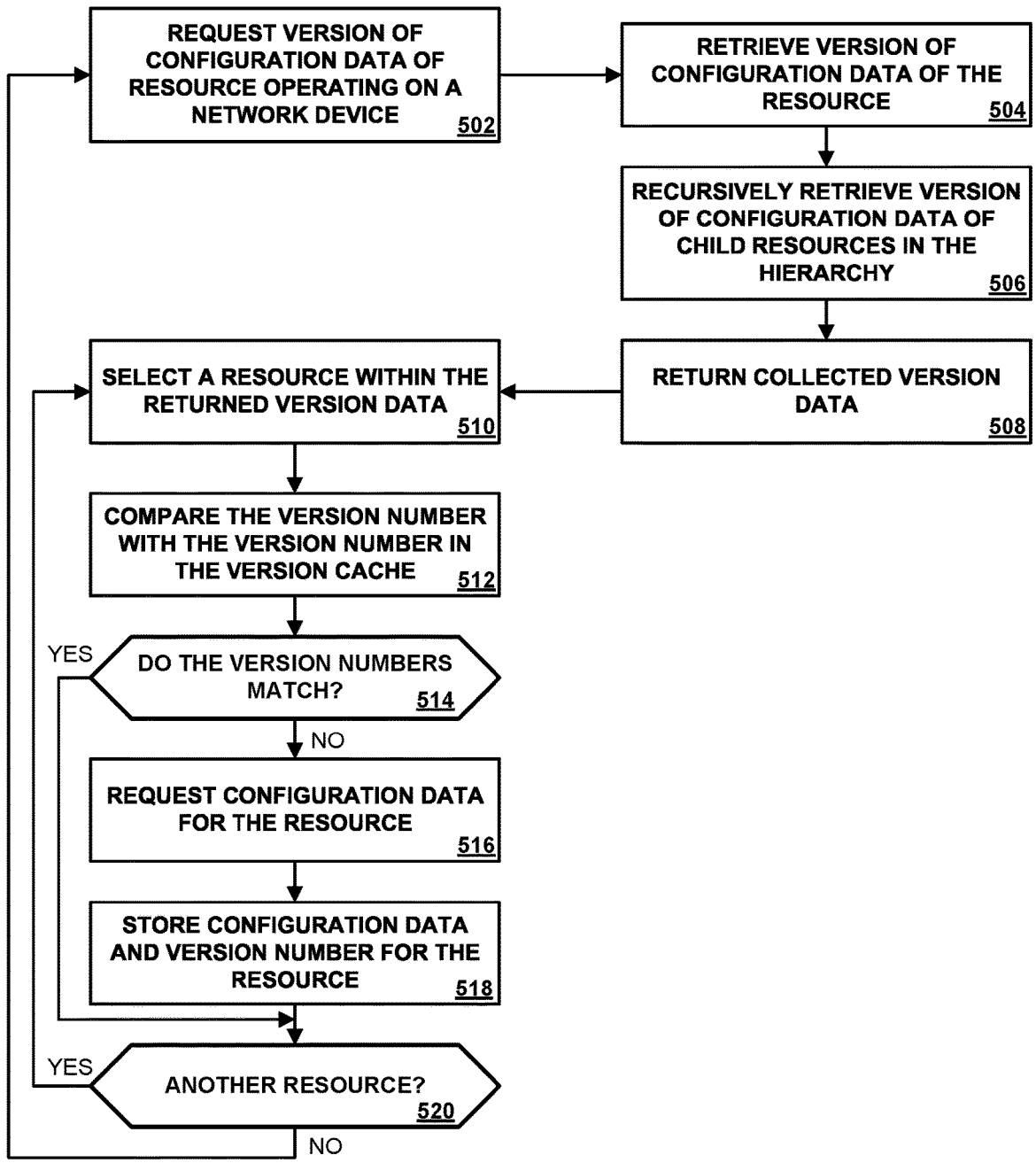
FIG. 5 is a flowchart of an example method of version cache management.

FIG. 5 is a flowchart of an example method of version cache management. Initially, the client 114 requests a version (e.g., a version ID) of a resource operating on a network element 104 (502). For example, the cache manager 310 may request the version(s) in response to detecting the network element 104 has rebooted. The configuration client 114 of the network element 104 retrieve the versions of the configuration data of the resource(s) requested (504). The client manager 114 recursively retrieves the version of the configuration data for child resources in the hierarchy (506). The client manager 114 returned the collected versions (508).

The client 114 selects a resource with the returned version data (510). The cache manager 310 compares the version number with a corresponding version number of the resource that is stored in the version cache 316 (512). The cache manager 310 determines whether the version ID of the selected resource received from the configuration client matches the corresponding version ID stored in the version cache 316 (514). When the version IDs do match (YES at 514), the method continues. When the version IDs do not match (NO at 514), the cache manager 310 requests the configuration data of the selected resource from the corresponding network element 104 (516).

The client manager 114 returns the configuration data for the resource (518).

The cache manager 310 stores the new configuration data (e.g., in the configuration data base 214) and the new version ID in the version cache 316 (520). When there is another resource to check (YES at 522), the cache manager 310 selects the next resource to check (510). Otherwise, when there is not another resource to check (NO at 522), the client manager 310 begins the process again with another set of resources (502).

Figure 6:
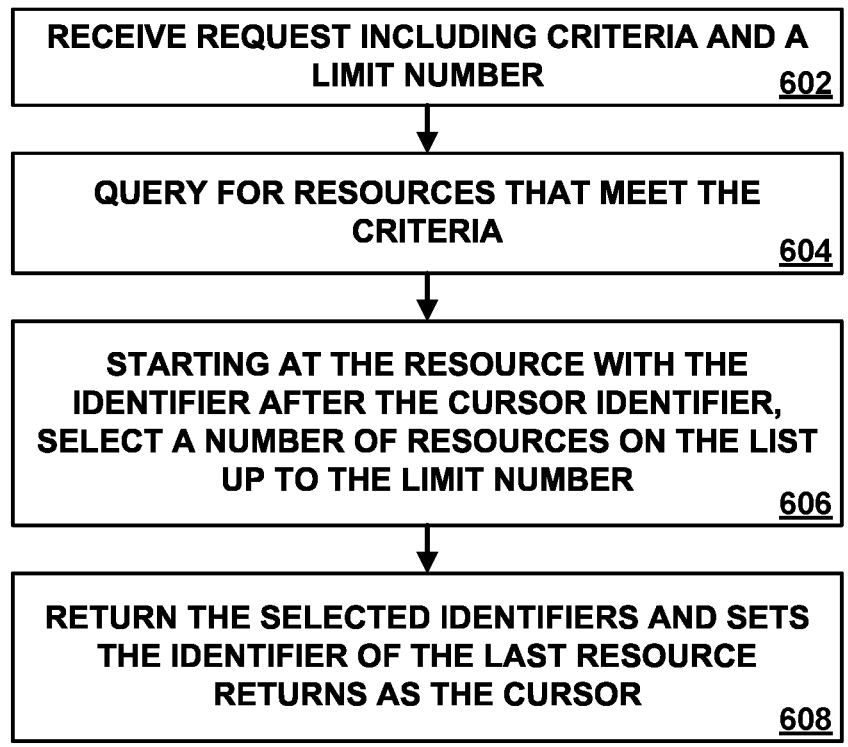
FIG. 6 is a flowchart of an example method of resource pagination.

FIG. 6 is a flowchart of an example method of resource pagination. Initially, the pagination controller 312 receives a request including criteria (e.g., request parameters) and a limit number (602). The pagination controller 312 queries the database storing the caches configuration data (e.g., the configuration database 214) for resources that meet the criteria (604). Starting at the resource with the identifier after the cursor identifier, the pagination controller 312 selects a number of resources on the list up to the limit number (606). On the initial request, the cursor may not hold a resource identifier and thus the first record would be selected. For example, if there are 1000 total resources that match the criteria and the limit number is 100, the pagination controller 312 may select the first 100 resource IDs. The pagination controller 312 returns the selected identifiers and/or records associated with the selected identifiers and sets the cursor to the resource ID of the last selected resource (608). Subsequently, the pagination controller 312 may receive a request for the next number of records to start at the record after the resource ID held in the cursor.

The techniques described in this disclosure may be implemented, at least in part, hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   receiving, by a server device and from a client device, a first query for resources that specifies a query parameter and a response limit;
   generating, by the server device, a first query response that includes a first list of resources that include a number of resources that satisfy the query parameter, the first number of resources being no longer than the response limit; and
   storing, by the server device, a first cursor identifier that identifies the last resource on the first list of resources in the first query response.

2. The method of claim 1, further comprising:
   receiving a second query for the resources that specifies the query parameter and the response limit;
   generating a second query response that includes a second list of resources that include a second number of resources that satisfy the query parameter, the second number of resources being no larger than the response limit, the second list starting with a resource selected based on the first cursor identifier; and
   storing a second cursor identifier that identifies the last resource on the second list of resources.

3. The method of claim 2, wherein a first resource on the second list corresponds to a resource after the resource associated with the first cursor identifier.

4. The method of claim 1, further comprising determining a total number of resources that satisfy the query parameter, wherein generating the first query response comprises, when the total number of resources that satisfy the query parameter exceeds the response limit, generating the first query response to include:
   a value representing the total number of resources that satisfy the query parameter; and
   the first list of resources such that the number of resources included in the first list of resources is less than the total number of resources that satisfy the query parameter, and equal to the response limit.

5. A processing system comprising one or more processors implemented in circuitry, the processing system being configured to:
   receive a first query for resources that specifies a query parameter and a response limit;
   generate a first query response that includes a first list of resources that include a first number of resources that satisfy the query parameter, the first number of resources being no larger than the response limit; and
   store a first cursor identifier that identifies a last resource on the first list of resources in the first query response.

6. The processing system of claim 5, wherein the processing system is further configured to:
   receive a second query for the resources that specifies the query parameter and the response limit;
   generate a second query response that includes a second list of resources that include a second number of resources that satisfy the query parameter, the second number of resources being no larger than the response limit, the second list starting with a resource based on the first cursor identifier; and
   store a second cursor identifier that identifies the last resource on the second list of resources.

7. The processing system of claim 6, wherein a first resource on the second list corresponds to the resource after the resource associated with the first cursor identifier.

8. The processing system of claim 5, wherein the processing system is further configured to determine a total number of resources that satisfy the query parameter, wherein to generate the first query response, the processing system is configured to include, when the total number of resources that satisfy the query parameter exceeds the response limit:
- a value representing the total number of resources that satisfy the query parameter; and
- the first list of resources such that the number of resources included in the first list of resources is equal to the response limit.

9. Computer-readable storage media having stored thereon instructions that, when executed, cause a processing system to:
- receive a first query for resources that specifies a query parameter and a response limit;
- generate a first query response that includes a first list of resources that include a first number of resources that satisfy the query parameter, the first number of resources being no larger than the response limit; and
- store a first cursor identifier that identifies a last resource on the first list of resources in the first query response.

10. The computer-readable storage media of claim 9, further comprising instructions that cause the processing system to:
- receive a second query for the resources that specifies the query parameter and the response limit;
- generate a second query response that includes a second list of resources that include a second number of resources that satisfy the query parameter, the second number of resources being no larger than the response limit, the second list starting with a resource based on the first cursor identifier; and
- store a second cursor identifier that identifies the last resource on the second list of resources.

11. The computer-readable storage media of claim 10, wherein a first resource on the second list corresponds to the resource after the resource associated with the first cursor identifier.

12. The computer-readable storage media of claim 9, further comprising instructions that cause the processing system to determine a total number of resources that satisfy the query parameter, wherein the instructions that cause the processing system to generate the first query response include instructions that cause the processing system to generate the first query response to include, when the total number of resources that satisfy the query parameter exceeds the response limit:
- a value representing the total number of resources that satisfy the query parameter; and
- the first list of resources such that the number of resources included in the first list of resources is equal to the response limit.

* * * * *